UNITED STATES PATENT OFFICE.

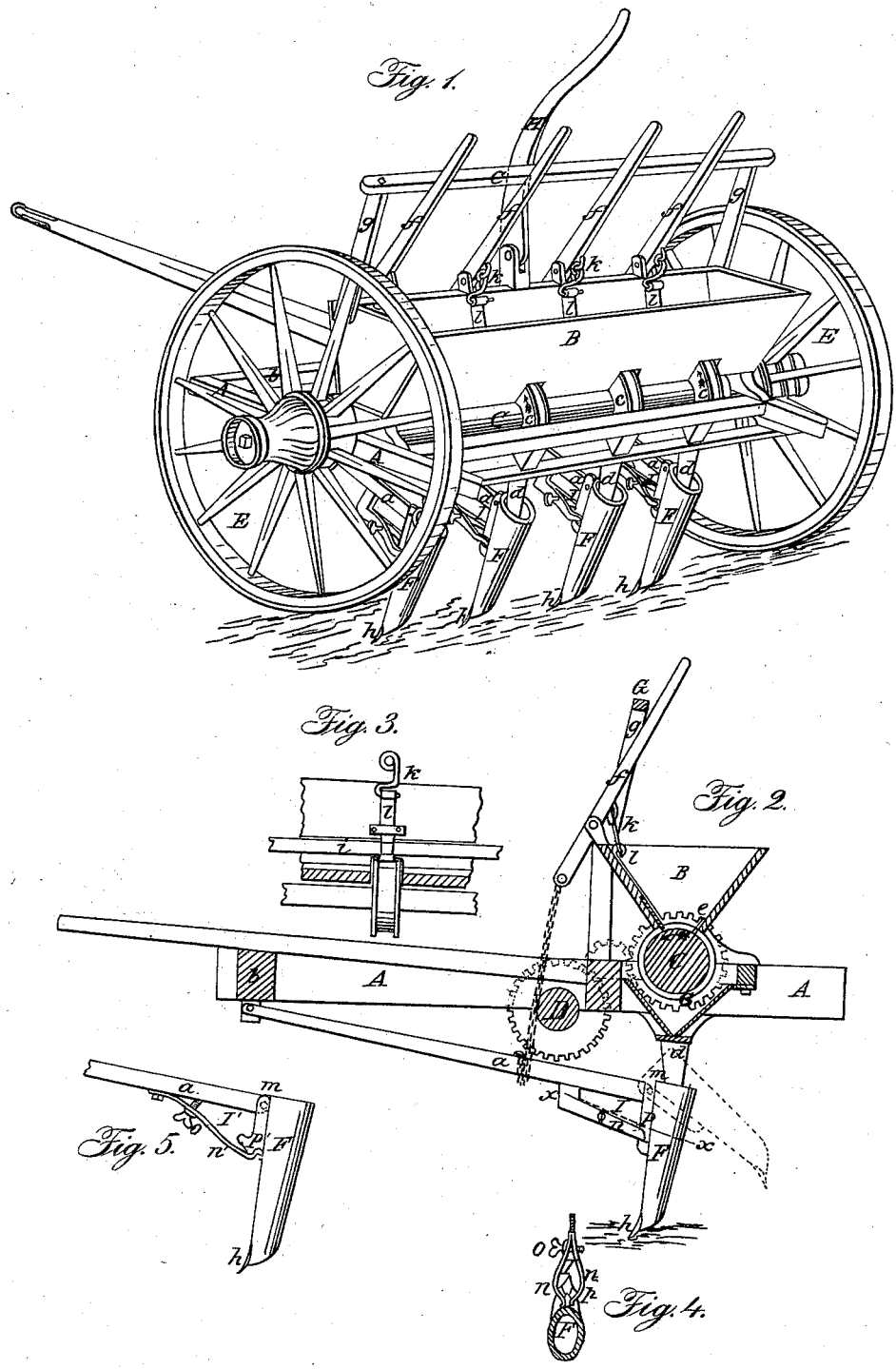

LEVI HAVERSTICKE, OF MANORTOP, PENNSYLVANIA.

CONSTRUCTION OF DRILL-TEETH IN SEED-PLANTERS.

Specification forming part of Letters Patent No. 7,241, dated April 2, 1850.

*To all whom it may concern:*

Be it known that I, LEVI HAVERSTICKE, of Manortop, in the county of Lancaster and State of Pennsylvania, have invented a new and useful Improvement in Seed-Drills, of which the following is a full, clear, and exact description, reference being had to the accompanying drawings, which form part of this specification, and in which—

Figure 1 represents a view in perspective of my machine. Fig. 2 is a vertical longitudinal section of the same. Fig. 3 is a vertical transverse section through a portion of the hopper. Fig. 4 is a section through the leg of the share at the dotted line $xx$ of Fig. 2; and Fig. 5 is an elevation of a portion of the machine, showing a modified arrangement of the spring-catch.

My invention consists in attaching the seed tube or shank of each share to its respective share-beam by a hinge, the shank being also connected with the share-beam by an adjustable spring-coupling sufficiently rigid to hold it with its share in the proper position for forming a furrow in earth, but which when the share strikes an obstacle that would otherwise break the machine, being detached by the strain from the shank, allows the latter to turn backward and pass over the obstacle.

My machine is constructed to discharge the seed in a continuous stream, the rate of discharge being regulated by a register. It is also so arranged that any one or all of the shares can be raised from the ground at will, while at the same time the discharge of seed to each share is stopped by the act of raising it.

In the drawings, A is the frame of my machine, on which the seed-hopper B, with its seed-roller C, is mounted, and which is supported on the axle D of the running wheels E E, the share-beams $aaaa$ being hinged to its front cross-bar, $b$.

The machine represented in the drawings is constructed to deposit seed in four furrows formed by four shares, $hhhh$, each attached to a seed tube or shank, F, through which the seed is dropped.

Immediately above the shanks is the seed-roller C. This is formed of a series of grooved wheels, $cccc$, attached to a shaft, and corresponding in number and position with the shares. These wheels pass through openings in the bottom of the seed-hopper, and deliver the seed from the hopper to the shanks of the shares through suitable spouts and tubes, $d$. The seed-roller is put in motion from the running wheels by cog-wheels, as shown at Fig. 2, and turns in the direction indicated by the arrows in the drawings. The opening made at the back of the hopper for the passage of each grooved wheel is closed to prevent the waste of seed by a plate, $e$, fixed to the back of the hopper, and fitted to the groove of the wheel. The rate at which the seed is delivered by the grooved wheel through the opening in the front of the hopper is regulated by an adjustable register-plate, $i$, which extends along the inner face of the front of the hopper, and has tongues depending from its lower edge, which enter the grooves in the seed-wheels. By drawing this register-plate upward the opening between the lower edge of the tongue and the bottom of the groove is enlarged and the rate at which the seed is discharged is proportionably increased, while by depressing the register-plate the opening, and consequently the discharge of seed, is correspondingly diminished. Each beam is hinged to the front cross-bar of the frame in such a manner that the shank of the share is held in an upright position, and each is connected with the lower extremity of a hand-lever, $f$, hinged to the front of the hopper, by depressing the hinder end of which the beam with its shank and share is raised from the ground. The whole series of hand-levers is surmounted by a bar, G, extending across the machine and hinged at each extremity to the front of the hopper by a radius-bar, $gg$. This cross-bar is depressed by a hand-lever, H, and, acting upon the whole series of beam hand-levers $ffff$, raises the whole series of shares $hhhh$ at once from the ground. Each hand-lever is connected by a link, $k$, with an upright register-plate, $l$, arranged to slide up or down over the large register-plate $i$. The lower extremity of the register-plate $l$ is fitted to the groove of the seed-wheel, and when any one hand-lever is depressed to raise its respective share from the ground this register-plate, being connected with the hand-lever, is depressed by the same operation, and closes the opening through which the seed is discharged until it is withdrawn by the lowering of the share.

The seed tubes or shanks F are not rigidly secured to their respective beams, but each is connected therewith by a hinge, m, on which it can turn backward to pass over any obstacle which may occur in its path, and the shank is retained in its upright position by an adjustable spring-coupling, I. This is formed of two spring-plates, n n, united at one extremity, bent as represented in Fig. 4, and connected with each other by a screw, o, so as to form a spring-vise, the jaws of which seize a rung, p, made for the purpose on the shank of the share.

The force with which the jaws hold the shank is regulated by the screw o in such manner that while it is held erect with sufficient force to form furrows in earth, yet when the share strikes an obstacle which would otherwise stop or break the machine, the pressure against the obstacle will drag the rung out from between the jaws which open with the strain and allow the shank to turn backward and pass over the obstruction. When the obstacle is passed the shank is returned to its position by the conductor of the machine.

A more simple modification of my invention is represented at Fig. 5. In this example there is but one spring-jaw, n', the upward pressure of which is opposed by the beam a. The spring-jaw catches beneath a rung, p', secured to the shank, the force with which the shank is held in its position being regulated by a screw, o', as in the former example.

The machine represented in the accompanying drawings and herein described is constructed with four shares to deposit seed in four furrows; but I do not confine myself to this particular number of shares, as more or less may be used as circumstances may render expedient.

Having thus described my improved seed-drill, what I claim therein as new, and desire to secure by Letters Patent, is—

The spring-coupling, constructed and arranged substantially as herein set forth.

LEVI HAVERSTICKE.

Witnesses:
C. S. WHITTMER,
DAVID SAYLOR.